US012750549B2

(12) United States Patent
Yang et al.

(10) Patent No.: US 12,750,549 B2
(45) Date of Patent: Sep. 29, 2026

(54) MEDIA DATA PLAYING METHOD AND DEVICE, STORAGE MEDIUM AND ELECTRONIC DEVICE

(71) Applicant: Beijing Zitiao Network Technology Co., Ltd., Beijing (CN)

(72) Inventors: Yuhao Yang, Beijing (CN); Xiaolu Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 197 days.

(21) Appl. No.: 18/508,932

(22) Filed: Nov. 14, 2023

(65) Prior Publication Data

US 2024/0163501 A1 May 16, 2024

(30) Foreign Application Priority Data

Nov. 14, 2022 (CN) ........................ 202211427159.2

(51) Int. Cl.
*H04N 21/431* (2011.01)
*G06F 3/0488* (2022.01)

(52) U.S. Cl.
CPC ....... *H04N 21/4316* (2013.01); *G06F 3/0488* (2013.01)

(58) Field of Classification Search
CPC ............ H04N 21/4316; H04N 21/431; H04N 21/472; G06F 3/0488; G06F 3/0481; G06F 2203/04803; G06F 3/0483
USPC ........................................................ 348/564
See application file for complete search history.

(56) References Cited

U.S. PATENT DOCUMENTS 9,052,806 B2 * 6/2015 Tseng .................... G06F 3/0485
9,583,142 B1 * 2/2017 Zhu .................... H04N 21/8173
10,819,668 B2 * 10/2020 Duan ...................... G06F 9/451
11,523,170 B2 * 12/2022 Li ...................... H04N 21/4622
2017/0111681 A1 4/2017 Jiang
2017/0357420 A1 * 12/2017 Dye ...................... G06F 16/215
2019/0026313 A1 1/2019 Zhang et al.
2019/0222899 A1 7/2019 Chen
(Continued)

FOREIGN PATENT DOCUMENTS

CN 104951301 A 9/2015
CN 105898610 A * 8/2016 .......... H04N 21/482
(Continued)

OTHER PUBLICATIONS

Office action received from Chinese patent application No. 202211427159.2 mailed on Mar. 26, 2024, 20 pages (10 pages English Translation and 10 pages Original Copy).
(Continued)

*Primary Examiner* — John W Miller
*Assistant Examiner* — Omer Khalid

(57) ABSTRACT

The embodiment of the present disclosure provides a media data playing method and device, a storage medium and an electronic device. The method therein comprises: displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user.

19 Claims, 8 Drawing Sheets

(56) References Cited

U.S. PATENT DOCUMENTS

| | | | |
|---|---|---|---|
| 2020/0260141 | A1 | 8/2020 | Radloff et al. |
| 2022/0413661 | A1 | 12/2022 | Jia et al. |
| 2023/0283858 | A1 | 9/2023 | Dong et al. |

FOREIGN PATENT DOCUMENTS

| | | | | | |
|---|---|---|---|---|---|
| CN | 107087235 | A | | 8/2017 | |
| CN | 110097471 | A | | 8/2019 | |
| CN | 110688571 | A | | 1/2020 | |
| CN | 111898058 | A | | 11/2020 | |
| CN | 112269917 | A | | 1/2021 | |
| CN | 112423084 | A | | 2/2021 | |
| CN | 112954440 | A | * | 6/2021 | ........... H04N 21/431 |
| CN | 113254135 | A | | 8/2021 | |
| CN | 113420247 | A | | 9/2021 | |
| CN | 115756249 | A | | 3/2023 | |
| EP | 4044613 | A1 | | 8/2022 | |
| GB | 2480777 | A | | 11/2011 | |
| WO | 2019/109592 | A1 | | 6/2019 | |

OTHER PUBLICATIONS

Notice of registration procedure received from Chinese patent application No. 202211427159.2 mailed on Aug. 2, 2024, 8 pages (4 pages English Translation and 4 pages Original Copy).

European Search Report for EP Patent Application No. 23890773.7, Issued on Mar. 10, 2026, 14 pages.

* cited by examiner

MEDIA DATA PLAYING METHOD AND DEVICE, STORAGE MEDIUM AND ELECTRONIC DEVICE

The present application is based on and claims priority of CN Application No. 202211427159.2, filed on Nov. 14, 2022, the disclosure of which is incorporated by reference herein in its entirety.

TECHNICAL FIELD

Embodiments of the present disclosure relate to Internet technology, and in particular, to a media data playing method and device, a storage medium, and an electronic device.

BACKGROUND ART

With the continuous development of network technology, more and more application programs are configured to present media data to users. User pages generally exist in the aforesaid application programs, and relevant information of page users is displayed.

CONTENTS OF THE INVENTION

The present disclosure provides a media data playing method and device, a storage medium, and an electronic device, so as to realize an easy and quick playing of the media data.

In a first aspect, an embodiment of the present disclosure provides a media data playing method, comprising:

displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user.

In a second aspect, an embodiment of the present disclosure provides a media data playing device, comprising:

a page display module configured to display a page display picture including a personalized display area and an information display area in response to a page trigger operation, wherein the personalized display area displays media data information of associated media data of a page user; and a media data playing module configured, in response to a play trigger operation of the page display picture, to play target media data corresponding to the page trigger operation, the target media data belonging to associated media data of the page user.

In a third aspect, an embodiment of the present disclosure further provides an electronic device, comprising:

one or more processors;

a storage means to store one or more programs, when the one or more programs are executed by the one or more processors, the one or more processors implement a media data playing method provided by any embodiment of the present disclosure.

In a fourth aspect, an embodiment of the present disclosure further provides a storage medium containing computer-executable instructions which, when executed by a computer processor, are configured to implement a media data playing method provided by any embodiment of the present disclosure.

BRIEF DESCRIPTION OF THE DRAWINGS

The above-mentioned and other features, advantages, and aspects of embodiments of the present disclosure will become more apparent by referring to the following detailed description of the embodiments with reference to the accompanying drawings. Throughout the drawings, the same or similar reference signs refer to the same or similar elements. It should be understood that the drawings are schematic and that components and elements are not necessarily drawn to scale.

DETAILED DESCRIPTION

Figure 1:
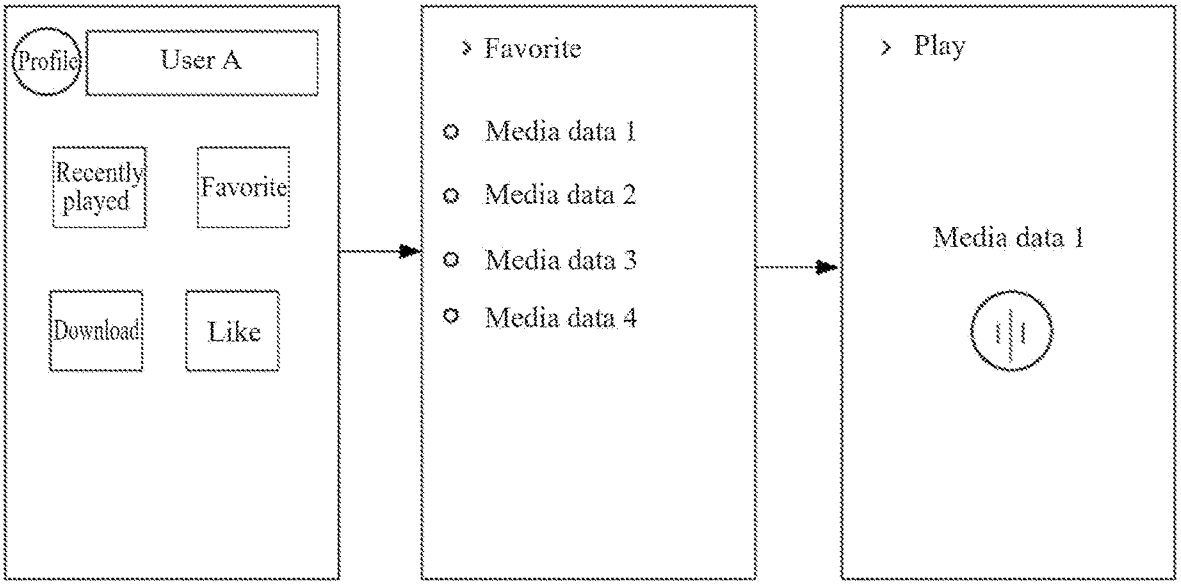
FIG. 1 is a schematic diagram of a process of playing media data on a personal homepage.

Embodiments of the present disclosure will be described in more detail below with reference to the accompanying drawings. Although certain embodiments of the present disclosure are shown in the drawings, it should be understood that the present disclosure maybe embodied in various forms and should not be construed as limited to the embodiments set forth herein, but rather these embodiments are provided for a more thorough and complete understanding of the present disclosure. It should be understood that the drawings and the embodiments of the present disclosure are for illustration purposes only and are not intended to limit the scope of the present disclosure.

It should be understood that the various steps recited in method embodiments of the present disclosure may be performed in a different sequences, and/or performed in parallel. Moreover, the method embodiments may include additional steps and/or omit performing the steps as shown. The scope of the present disclosure is not limited in this respect.

The term "including" and variations thereof as used herein is intended to be open-ended, i.e., "including, but not limited to". The term "based on" is "at least partially based on". The term "one embodiment" refers to "at least one embodiment"; the term "a further embodiment" refers to "at least one further embodiment"; the term "some embodiments" refers to "at least some embodiments". Relevant definitions for other terms will be given in the following description.

It should be noted that the wordings "first", "second", and the like as mentioned in the present disclosure are only used for distinguishing different devices, modules or units, and are not used for limiting the sequence of the functions performed by these devices, modules or units or interdependence thereof.

It should be noted that definitions of "one" or "more" as mentioned in the present disclosure are intended to be exemplary rather than limiting, which shall be construed by those skilled in the art as "one or more", unless the context clearly indicates otherwise.

The names of messages or information exchanged between a plurality of devices in the embodiments of the present disclosure are for illustrative purposes only, and are not intended to limit the scope of the messages or information.

It maybe understood that, prior to the implementation of the technical solutions disclosed in the embodiments of the present disclosure, users shall be informed of the type, the range of use, the scenarios of use, etc. of personal information related to the present disclosure in a proper manner in accordance with relevant laws and regulations, and authorization of the users shall be obtained.

For example, in response to the receipt of a user's proactive request, prompt information is sent to the user to explicitly prompt the user that the requested operation to be performed would require acquisition and use of personal information of the user. Accordingly, the user can autonomously select whether to provide personal information to software or hardware, such as an electronic device, an application program, a server or a storage medium that performs the operations of the technical solution of the present disclosure, according to the prompt information.

As an optional but non-limiting implementation manner, in response to the receipt of a user's proactive request, sending the prompt information to the user may take the form of, for example, a pop-up window, and the prompt information may be presented in a text manner in the pop-up window. In addition, a selection control for the user to choose to "agree" or "disagree" the presentation of personal information to the electronic device can be further carried in the pop-up window.

It may be understood that the above process of notification and acquisition of a user's authorization is only illustrative and is not intended to limit the implementation manner of the present disclosure, and other manners satisfying the relevant laws and regulations may also be applied to the implementation of the present disclosure.

It may be understood that the data involved in the present disclosure, including but not limited to the data itself, the acquisition or use of the data, should comply with the requirements of the applicable laws and regulations and related rules.

At present, a plurality of selection steps are required to achieve the playing of the selected media data on a user page, where there is a problem of complexity in operation.

In the embodiment of the present disclosure, by displaying a page display picture, a personalized display is performed in the page display picture based on the associated media data of a page user. In the meantime, on the basis of the display of page display picture, the target media data in the associated media data of the page user is played, multi-step selection operation on the target media data is not needed, thereby simplifying the playing process of the media data.

In application programs related to media data, the media data played or followed by a user on a homepage can be displayed through the personal homepage, and for example, reference maybe made to FIG. 1, which is a schematic diagram of a process of playing media data on a personal homepage. In the case of logging onto a personal homepage, personal information and identifiers of played, followed, downloaded and other types are displayed, and a next level of page corresponding to the identifiers is turned to by way of performing a trigger operation on the above identifiers, wherein this level of page can contain media data or a media data packet under the identifiers, and playing of selected media data is achieved through triggering of the media data or further operation on the media data packet or on the media data in the media data packet. There are many operation steps in the above process of playing media data, where there is a problem of complexity in process. It should be noted that FIG. 1 is only one example.

Meanwhile, personal homepages of different users are largely identical with only minor differences in personal information and profile, which are in lack of personalized display of the users on the page, particularly the personalized display in the dimension of media data directed to the homepage users.

Figure 2:
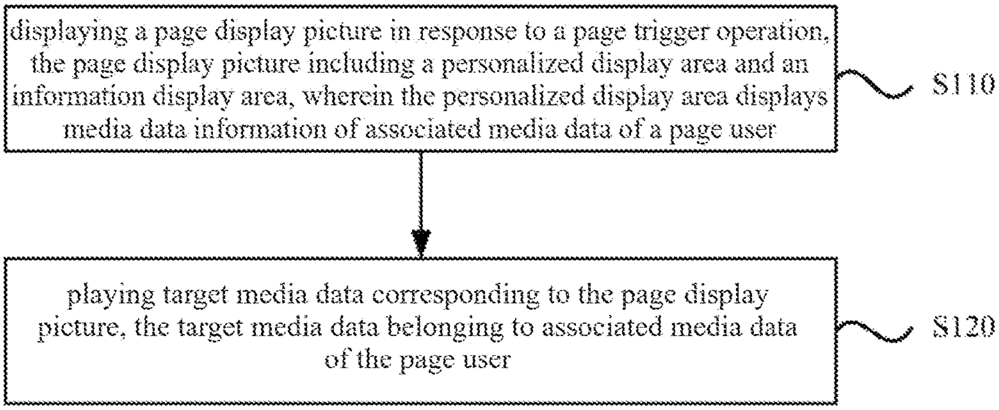
FIG. 2 is a schematic flowchart of a media data playing method according to an embodiment of the present disclosure.

In view of the above technical problems, an embodiment of the present disclosure provides a media data playing method, and referring to FIG. 2, which is a schematic flowchart of a media data playing method according to an embodiment of the present disclosure, the embodiment of the present disclosure is suitable for the case of conveniently playing media data and simplifying a playing process when a preset page is logged onto, where the method may be implemented by a media data playing device which may be embodied in form of software and/or hardware, and optionally may be implemented by an electronic device which may be a mobile terminal, a PC terminal or a server, etc. As shown in FIG. 2, the method comprises:

S110, displaying a page display picture in response to a page trigger operation, the page display picture including a personalized display area and an information display area, wherein the personalized display area displays media data information of associated media data of a page user; and

S120, playing target media data corresponding to the page display picture, the target media data belonging to associated media data of the page user.

In this embodiment, the information related to the media data is displayed to the user through the interaction of the application program with the user, and the media data is played in response to the trigger operation by the user on the display page of the application program. Here, the application program may perform display and playing of a single type of media data, or may perform display and playback of different types of media data. The media data may include, but is not limited to, audio data, video data, and the like. Optionally, the media data may be music data.

In this embodiment, the page trigger operation may be a starting operation of the application program, displaying a page display picture of the application program; the page trigger operation may also be a trigger operation of a specific page, and accordingly, the page trigger operation may be a trigger operation of a specific page tag (for example, a click operation of a specific page tag), or a switching operation of a specific page (for example, a swipe operation of a preset track), and the like. Optionally, the page may be a personal homepage.

The page display picture, which includes a personalized display area and an information display area, is displayed, wherein the information display area may display page user information, the page user information here being configured through an information collection page, including but not limited to a user nickname, a user profile, etc. The personalized display area displays media data information of associated media data of a page user, wherein the page user is a user corresponding to the current page display picture, the page user may also be a login user of the current application or may also be an accessed user. The associated media data of the page user may be media data of pre-operation performed in advance by the page user, which may be, for example, media data set as a favorite, or media data set with a like tag, or downloaded media data.

The associated media data is related to the degree of concern and the type of interest of the page user on the media data, the associated media data corresponding to different page users are different, and personalized differences of different page users can be embodied through the associated media data in the dimension of media data.

The media data information of the associated media data is information related to the associated media data, including but not limited to text information, images or graphics, etc. The media data information corresponding to the associated media data is further determined by determining the associated media data of the page user, and the media data information corresponding to at least partially associated media data is displayed in the personalized display area. It may be understood that the associated media data corresponding to different homepage users are different, correspondingly, the media data information displayed in the personalized display area in the page display picture corresponding to different homepage users is also different, and the media data information displayed in the personalized display area can reflect the personalized information of the homepage users in the dimension of media data, which favors the improvement in the vividness and impressiveness of the page display picture and the improvement in the diversity and individuation of the page display picture.

In this embodiment, no limitation is set on the positional relationship between the information display area and the personalized display area in the page display picture, as well as on the area sizes of the information display area and the personalized display area, and configurations can be made according to the demands of users. Further, the display position and the display size of at least one of the information display area and the personalized display area can be adjusted, in response to the configuration operation of the homepage user on the information display area and/or the personalized display area.

Figure 3A:
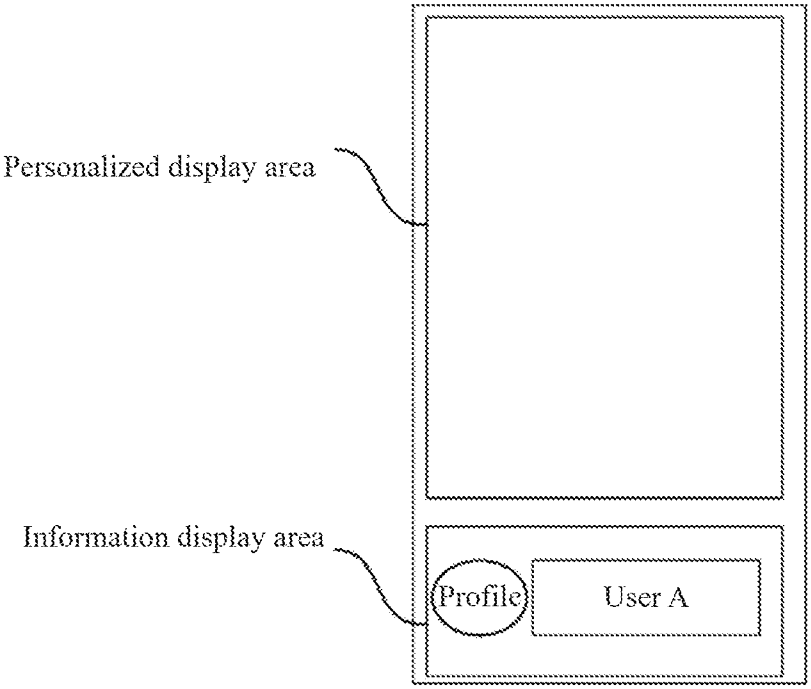
FIG. 3*a* is a schematic positional diagram of an information display area and a personalized display area in a page display picture provided by an embodiment of the present disclosure.
Figure 3B:
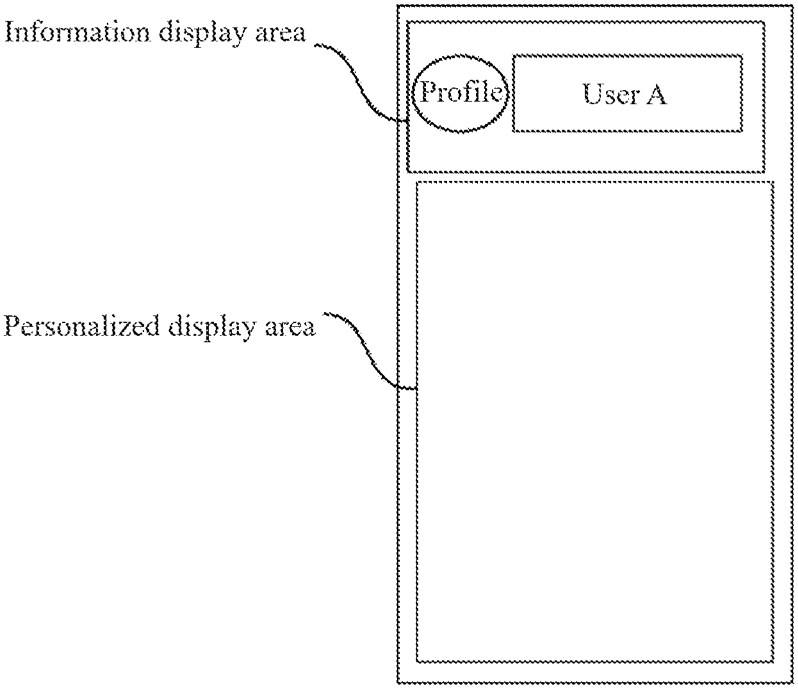
FIG. 3*b* is a schematic positional diagram of an information display area and a personalized display area in a page display picture provided by an embodiment of the present disclosure.
Figure 3C:
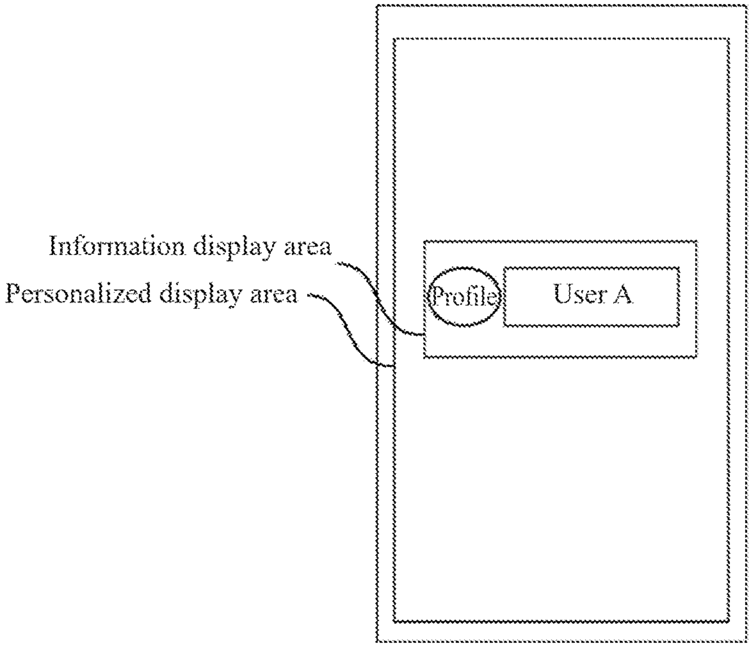
FIG. 3*c* is a schematic positional diagram of an information display area and a personalized display area in a page display picture provided by an embodiment of the present disclosure.

In some embodiments, the information display area may be disposed at the top of the personalized display area, or the information display area may be disposed at the bottom of the personalized display area, or the information display area may be disposed in the middle of the personalized display area. In some embodiments, there is no area overlap between the information display area and the personalized display area, and in some embodiments, there may be an overlap between the information display area and the personalized display area. For example, reference maybe made to FIG. 3*a* to FIG. 3*c*, wherein FIG. 3*a* to FIG. 3*c* are schematic positional diagrams of an information display area and a personalized display area in a page display picture, respectively. In FIG. 3*a*, there is no area overlap between the information display area and the personalized display area, and the information display area is disposed at the bottom of the personalized display area; in FIG. 3*b*, there is no area overlap between the information display area and the personalized display area, and the information display area is disposed at the top of the personalized display area; in FIG. 3*c*, there is an area overlap between the information display area and the personalized display area, and the information display area is disposed in the middle of the personalized display area. In FIG. 3*c*, the information display area and the personalized display area may be displayed through different layers, and the layer on which the information display area is located may be an upper layer of the layer on which the personalized display area is located.

Based on the above embodiments, the display position of the information display area is adjusted in response to the position adjustment operation on the information display area in the page display picture. The position adjustment operation may be a dragging operation on the information display area, and correspondingly, the release position of the position adjustment operation may be an adjusted display position of the information display area. For example, the position adjustment mode of the information display area may be entered through a preset operation, and the display position of the information display area may be adjusted according to the position adjustment operation, wherein the preset operation may be, for example, a click operation exceeding a preset time period, to which no definition is made here. It may be understood that the display position of the information display area of the page display picture is adjusted, and correspondingly, the display position of the personalized display area may be adjusted. The display demands of page users are further met by adjusting the display positions of the information display area and/or the personalized display area in the page display picture, thereby meeting the demand on personalized display.

Figure 4:
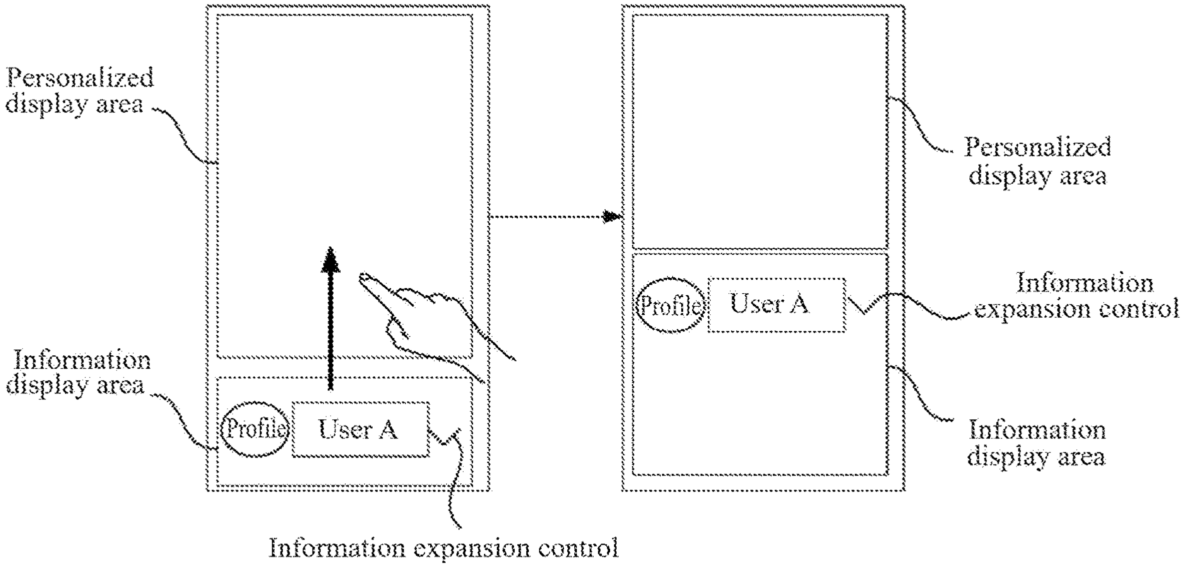
FIG. 4 is a schematic diagram of adjustment of an information display area provided by an embodiment of the present disclosure.

Based on the above embodiments, the area size and the display content of the information display area are adjusted in response to the display adjustment operation on the information display area in the page display picture. In some embodiments, the size of the information display area is smaller than a predetermined size, for example, the height of the information display area is smaller than a predetermined value. In some embodiments, the amount of information displayed within the information display area maybe a predetermined data line, for example one line. Optionally, part of the information in the information display area may be hidden, and the hidden information is displayed in response to a display adjustment operation on the information display area. For example, the information display area includes an information expansion control, and accordingly, the display adjustment operation on the information display area may be a trigger operation on the information expansion control, and the size of the area of the information display area is expanded in response to the display adjustment operation, so as to display the hidden information. For example, the display adjustment operation of the information display area may be a swipe operation with the information display area as a starting point, and the swipe operation may be an upward swipe operation with the information display area disposed at the bottom of the page display picture as an example; the swipe operation may be a downward swipe operation with the information display area disposed at the top of the page display picture as an example. For example, reference is made to FIG. 4, which is a schematic diagram of adjustment of an information display area provided by an embodiment of the present disclosure. Here, the area size of the information display area after adjustment may be determined according to the amount of hidden information, may also be determined according to the swipe distance of the above swipe operation, and may also be a preset area size, to which no definition is made herein. By means of hiding part of the information in the information display area, it is prevented that the area size of the information display area in the page display picture is too large. The hidden information is displayed through the display adjustment operation, so as to achieve display of comprehensive information.

In the above embodiments, the media data information displayed in the personalized display area includes associated images of at least partially associated media data of the page user, and/or tag information corresponding to the associated media data of the page user, wherein the associated images of the media data are images associated with the media data, which include, but are not limited to, a cover image, a poster image, a image of an associated person (e.g., a singer image of music data, a character image in video data), and the like of the media data. The tag information may be classification tag information of the media data, taking the media data being music data as an example, the tag information includes but is not limited to classical music, jazz, rock and the like, and taking the media data being podcast data as an example, the tag may include but is not limited to talkshow, news, music and the like.

The tag information displayed here may be tag information for respectively determining associated media data of the page user, and the tag information of respective associated media data is counted, wherein the statistical result of the tag information may include the amount of associated media data corresponding to respective tag information and/or the play amount of the associated media data corresponding to respective tag information. The tag information to be displayed is determined based on the statistical result of the tag information, and optionally, the tag information to be displayed may be determined by sequencing a plurality of tag information based on the statistical result of the tag information and determining a preset amount of or a preset proportion of tag information in the sequenced tag information as the tag information to be displayed. Optionally, the statistical result of respective tag information may be determined according to a preset threshold (e.g., a preset media amount threshold and/or a preset play amount threshold), and the tag information that is greater than the preset threshold is determined as the tag information to be displayed.

Due to the limitations of the personalized display area, the amount of the media data information that can be displayed is limited, at least partially associated media data is determined from the entire associated media data of the page user, and the associated images of the at least partially associated media data are displayed in the personalized display area. At least partially associated media data may be randomly determined from the entire associated media data of the page user, may also be determined according to a preset screening rule, and may also be determined according to a selection operation of the user on the associated media data, to which no definition is made herein.

In some embodiments, a method of determining at least partially associated media data comprises: sequencing a plurality of associated media data according to the degree of concern of the associated media data in the plurality of associated media data of the page user, and screening the associated media data based on the sequence and the preset amount, wherein the degree of concern of the associated media data in the preset window is determined, wherein the degree of concern of the associated media data can be determined by one or more of the play amount of the associated media data, whether a like tag is set, and the forwarding amount of the associated media data. Optionally, a determination rule of the degree of concern may be set, specifically, one or more of the play amount, the value of concern corresponding to the like tag, and the forwarding amount of the associated media data may be subjected to weighted summation processing, so as to obtain the degree of concern of the associated media data.

The associated media data is sequenced according to the degree of concern of the associated media data, and the sequenced associated media data is screened according to the preset amount. The associated images of the screened associated media data are displayed. The preset amount may be the amount of the associated images to be displayed, and the preset amount may be predetermined, to which no definition is made herein. It may be understood that the associated image of respective associated media data may be pre-stored, and may be matched according to the screened associated media data, so as to determine the corresponding associated image. It may be understood that the associated image of respective associated media data may also be set in the cloud, and a request for the associated image is sent to the cloud according to the associated media data subjected to the screening processing, so as to obtain the corresponding associated image.

In some embodiments, prior to the screening of the associated media data, the method further comprises determining whether the amount of the plurality of associated media data of the page user is greater than a preset amount, if so, the associated media data is screened, otherwise, the plurality of associated media data of the page user is all determined as the screened associated media data, without any need for the process of determining the degree of concern of respective associated media data, as well as sequencing and screening process, which simplifies the screening process.

Correspondingly, in the case where the amount of the plurality of associated media data of the page user is smaller than the preset amount, the preset placeholder image is called, wherein the preset placeholder image is pre-stored or requested from the cloud, and the amount of the preset placeholder image can be determined according to a difference value between the amount of the plurality of associated media data of the page user and the amount of the display images in the personalized display area. Optionally, the preset placeholder image may be randomly determined in a set of a large number of pre-stored placeholder images, so as to improve the diversity of the display contents in the personalized display area.

The media data information displayed in the personalized display area may include one or more of an associated image of the associated media data, a preset placeholder image and tag information. In some embodiments, if the amount of the associated media data of the page user is zero, the media data information displayed in the personalized display area includes a preset placeholder image; in some embodiments, if the amount of the associated media data of the page user is greater than zero and smaller than the preset number, the media data information displayed in the personalized display area includes at least one of an associated image and tag information of the associated media data, as well as a preset placeholder image. If the amount of the plurality of associated media data of the page user is greater than the preset amount, the media data information displayed in the personalized display area includes at least one of an associated image and tag information of the associated media data.

Figure 5:
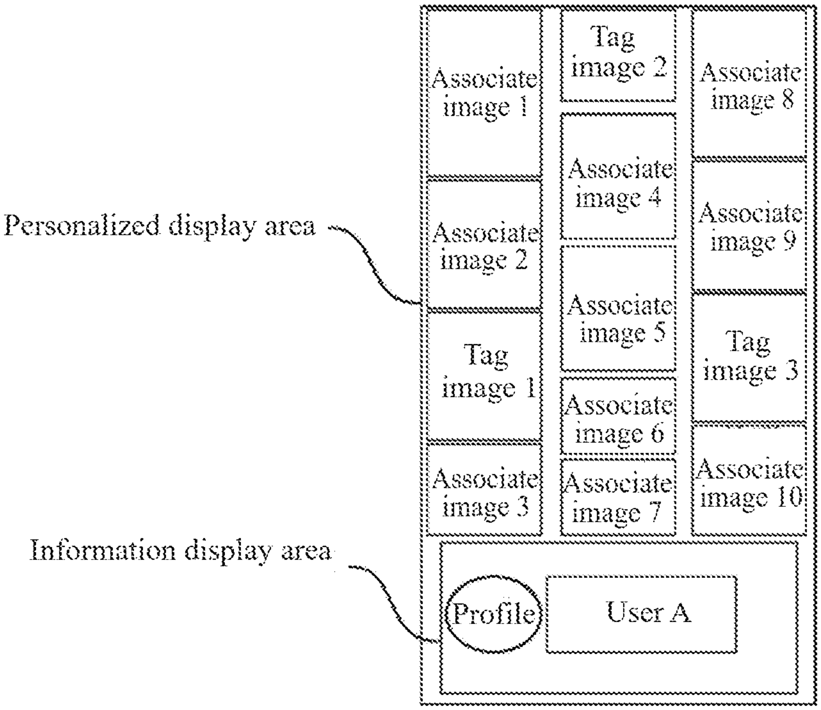
FIG. 5 is a schematic diagram of a page display picture provided by an embodiment of the present disclosure.

Based on the above embodiments, the media data information displayed in the personalized display area includes the associated images and/or tag images corresponding to the tag information, wherein the associated images and/or the tag images are displayed in a mosaicking manner. For example, reference is made to FIG. 5, which is a schematic diagram of a page display picture provided by an embodiment of the present disclosure. The personalized display area in FIG. 5 includes associated images and/or tag images that are displayed in a mosaicking manner. In some other embodiments, the media data information displayed in the personalized display area includes associated images displayed in a mosaicking manner; alternatively, the media data information displayed in the personalized display area includes tag images displayed in a mosaicking manner. And, in some embodiments, the media data information displayed in the personalized display area includes associated images, tag images and preset placeholder images that are displayed in a mosaicking manner. In some embodiments, the media data information displayed in the personalized display area includes preset placeholder images that are displayed in a mosaicking manner.

Here, the tag image may be formed by adding tag information into a preset background image, and the preset background image here may be a solid-color image or the like, to which no definition is made herein. Different tag images may correspond to different preset background images, and for example, different tag images may be backgrounds corresponding to different colors.

In some embodiments, no specific display positions are defined in the personalized display area, and self-adaptive display may be performed according to the media data information to be displayed, and accordingly, the display position of respective media data information may vary according to the display sequence of the media data information. Optionally, the mosaicking display method for the associated images and/or the tag images comprises: determining the display positions of the associated images and/or the tag images in the personalized display area according to the display sequence of the associated images and/or the tag images, and displaying the associated images and/or the tag images at respective display position.

The display sequence of the media data information, such as the associated images and/or the tag images, may be determined randomly, or may be determined according to a preset sequencing manner, for example, the preset sequencing manner may be a degree of display importance for the media data information. For example, the degree of importance of the associated images may be a degree of concern of the associated media data corresponding to the associated images; the degree of display importance of the tag images may be a statistical result of the corresponding tag information. There is a corresponding relationship between the degree of display importance of the media data information and the display sequence of the media data information. According to the display sequence of the media data information and to the dimension of respective media data information in sequence, corresponding display positions are determined and the corresponding media data information is displayed on the display positions.

It should be noted that, for a case where dimensions of the associated images, the tag images, the preset placeholder images, and the like are inconsistent, prior to the display of the above media data information, the dimensions of the above respective media data information are individually adjusted, and the above media data information after the dimension adjustment is displayed in the personalized display area, wherein the dimension adjustment comprises one or more of scaling the media data information, or adjusting the width and height, etc. For example, the above media data information may be adjusted as a uniform width data or a uniform height data. For example, the adjusted media data information has the same width data, and the adjusted media data information is arranged in columns (see FIG. 5). For example, the display position of each piece of media data information may be determined in turn according to the display sequence of the media data information. Specifically, in each display column, according to the height data of each piece of media data information which is sequenced in turn, a display position in the display column is determined, and each piece of media data information is displayed at the corresponding display position. Correspondingly, the adjusted media data information has the same height data, and the adjusted media data information is arranged in rows.

Figure 6:
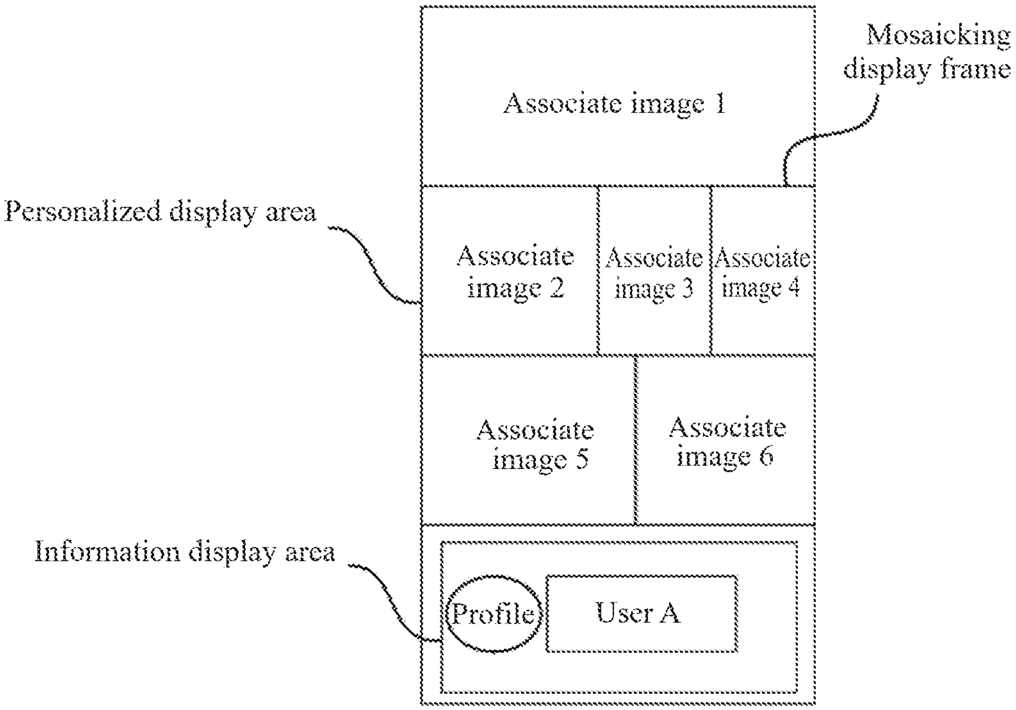
FIG. 6 is a schematic diagram of a page display picture provided by an embodiment of the present disclosure.

In some embodiments, display positions of the media data information are defined in the personalized display area, for example, the display positions may be defined through a fixed mosaicking display frame. Correspondingly, the amount, the position and the dimension of the display positions are fixed, and the media data information is adjusted to adapt to corresponding display positions, and is displayed at corresponding display positions. Optionally, the mosaicking display method for the associated images and/or the tag images comprises: acquiring a mosaicking display frame which includes a plurality of display positions; determining the display positions of the associated images and/or the tag images in the mosaicking display frame, and displaying correspondingly the associated images and/or the tag images at the display positions. For example, reference is made to FIG. 6, which is a schematic diagram of a page display picture provided by an embodiment of the present disclosure, wherein the display position in FIG. 6 is in form of a square, which is only an example. In other embodiments, the display position may further be in one or more other shapes such as a triangle, a sector, a circle, and an irregular shape, to which no definition is made herein. It should be noted that the media data information as shown in FIG. 6 only includes associated images, which is an example here, and in other examples, it may also include tag images, preset placeholder images, and the like.

According to the corresponding relationship between the media data information and the display positions, the dimension of the media data information is adjusted depending on the dimension of the display positions, so that the adjusted media data information is matched with the dimension of the display positions, thereby displaying the media data information at the display positions, wherein the corresponding relationship between the media data information and the display positions can be determined randomly or by a preset corresponding relationship.

In some embodiments, the plurality of display positions included in the mosaicking display frame are the same in dimension. In some embodiments, the plurality of display positions included in the mosaicking display frame are different in dimension, and the corresponding relationship between the display positions and the media data information can be determined according to the dimensions of the display positions.

Optionally, determining display positions of the associated images and/or the tag images in the mosaicking display frame comprises: matching the dimensions of the display positions with the dimensions of the associated images and/or the tag images to obtain the matching degree of the images and the display positions, and determining the display positions corresponding to the associated images and/or the tag images based on the matching degree. As shown in FIG. 6, the dimensions of the display positions are different, and in order to simplify the dimension adjustment process for each piece of media data information, the dimension of the media data information is matched with the dimension of each display position, the media data information and the display position with the greatest matching degree are determined, and the media data information is displayed in the matched display position. Specifically, for any display position, the dimension matching degree of the display position and respective media data information is determined, the data information is sequenced based on the dimension matching degree, the piece of media data information with the greatest dimension matching degree is determined, the piece of media data information that matches with the next display position is determined in the rest pieces of media data information, and so on and so forth, until the corresponding display position for each piece of media data information is determined, and the corresponding piece of media data information is displayed in the respective display position. The corresponding relationship between the display position and the media data information is determined based on the dimension matching degree, which simplifies the preprocessing process of the media data information.

Optionally, determining display positions of the associated images and/or the tag images in the mosaicking display frame comprises: matching the first priority of the associated images and/or the tag images with the second priority of the display positions, and determining the display positions corresponding to the associated images and/or the tag images according to a priority matching result, wherein the second priority of the display positions is determined based on the dimension and/or position of the display position.

The dimensions and positions of different display positions have different display effects of the media data information, and as shown in FIG. 6, the display effect of the display position where the associated image 1 is located in FIG. 6 is better than the display effects of other display positions; correspondingly, different display positions correspond to different priorities, i.e., the second priorities of the display positions, according to the dimensions and positions of the display positions. Since the mosaicking display frame is fixed, the second priorities of the display positions in the mosaicking display frame are preset. The priority of the media data information may be determined according to the type of the media data information, and for example, the priorities of the associated image, the tag image, and the preset placeholder image decrease sequentially. A first priority for each piece of media data information is further determined for each type of media data information. For the associated images, a first priority may be determined based on the degree of concern of the associated media data corresponding to the associated images; for the tag images, a first priority may be determined based on statistical information of tag information corresponding to the tag images. For the preset placeholder images, a first priority may be determined randomly or based on a frequency of use of the preset placeholder images.

A matching is performed based on the first priority of the media data information and the second priority of the display positions, determining that there is a corresponding relationship between the media data information and the display positions with the same priority, and the media data information is displayed at the corresponding display positions to form display content of the personalized display area.

On the basis of the above embodiments, a plurality of mosaicking display frames may be configured in advance, the display effect of each mosaicking display frame maybe previewed on a preview interface, and the media data information is displayed on the basis of the selected mosaicking display frame in response to the selection operation on any mosaicking display frame.

In this embodiment, at least one type of media data information of the associated images, the tag images and the preset placeholder images is displayed in the personalized display area in a mosaicking manner by means of forming the tag information into corresponding tag images, thereby forming an image wall corresponding to the associated media data of the homepage user, and by displaying the image wall in the page display picture, the personalized demands of the page user on the media data can be displayed, which improves the display vividness and impressiveness of the page display picture.

Figure 7:
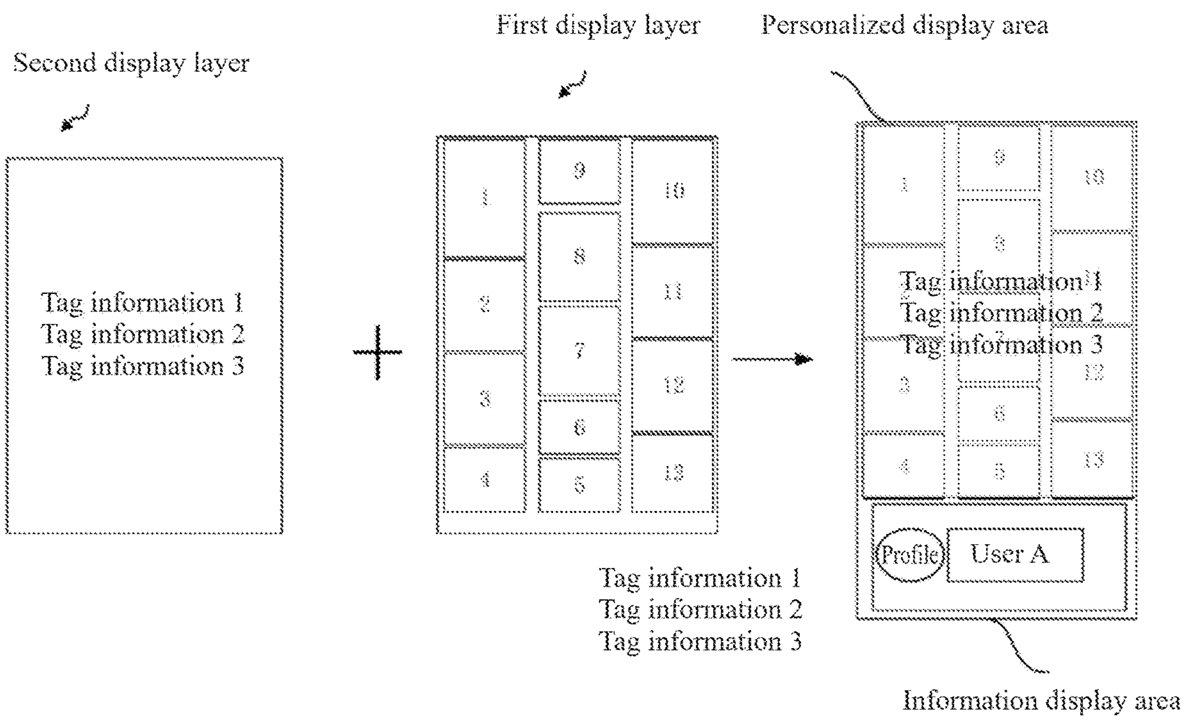
FIG. 7 is a schematic diagram of a page display picture provided by an embodiment of the present disclosure.

On the basis of the above embodiment, an embodiment of the present disclosure provides a further display manner for media data information in a personalized display area. Specifically, the media data information displayed in the personalized display area includes tag information and associated images corresponding to at least partially associated media data, and the tag information is highlighted in the personalized display area. For example, the tag information may be displayed on the upper layer of the associated images, that is, the associated images and/or the preset placeholder images forma display background, and the tag information is regarded as the display foreground information. Specifically, the associated images may be displayed through a first display layer, the tag information may be displayed through a second display layer, and the second display layer is located on an upper layer of the first display layer. Reference is made to FIG. 7, which is a schematic diagram of a page display picture provided by an embodiment of the present disclosure. It may be understood that the second display layer has a preset transparency, so that the personalized display area can display the associated images and/or the preset placeholder images at the same time of highlighting the tag information. Here, no definition is made to the amount and the display manner of the associated images in the first display layer and the amount and the display manner of the tag information in the second display layer, and FIG. 7 is only an example; in other embodiments, one or more associated images are displayed in the first display layer, and the display manner of the plurality of associated images may be a mosaicking display, an overlapping display, or the like. For the associated images displayed in a mosaicking manner, the display positions can be determined randomly, and the images can be displayed through a mosaicking display frame.

Figure 8:
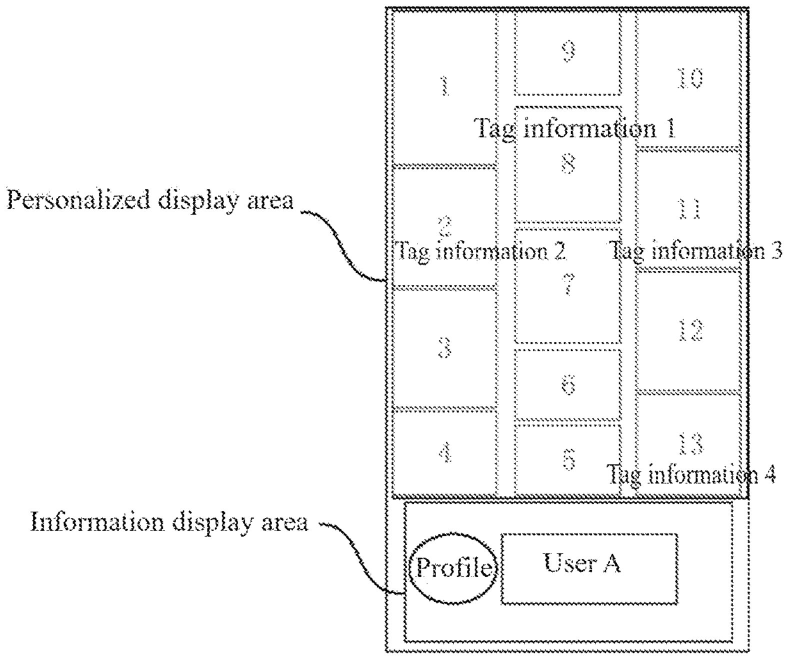
FIG. 8 is a schematic diagram of a page display picture provided by an embodiment of the present disclosure.

The tag information in the second display layer may be sequentially arranged, may also be annularly arranged, and may further be randomly displayed at any position in the second display layer. In some embodiments, the tag information in the second display layer is displayed based on a preset display sequence, which may be determined based on a statistical result of the tag information, as shown in FIG. 7. In some embodiments, the display positions of the tag information in the second display layer match the display positions of corresponding associated images in the first display layer. As shown in FIG. 8, FIG. 8 is a schematic diagram of a page display picture provided by an embodiment of the present disclosure. For any tag information, among the associated images displayed in the first display layer, an associated image that matches this tag information is determined, that is, an associated image corresponding to the associated media data that matches this tag information is determined, and a preset display range of the tag information in the second display layer is determined based on the display position of this associated image.

It should be noted that the numerals in the first display layer in FIG. 7 and FIG. 8 respectively represent a corresponding associated image or preset placeholder image. Accordingly, in FIG. 8, associated image 2 corresponds to tag information 2, and associated image 8 corresponds to tag information 1, etc. It may be understood that there may be a plurality of associated images in the first display layer that match the same tag information, where any associated image may be determined randomly to determine the display position of the tag information.

In this embodiment, the associated image and the tag information are respectively displayed through different layers to highlight the tag information.

On the basis of the above embodiment, the tag information can be displayed in the personalized display area in a highlighted manner, or the associated images and the tag images can be displayed in the personalized display area, and the tag images are displayed based on a preset highlighting manner. The preset highlighting manner includes, but is not limited to: adjusting the dimension of the tag image to a highlighting dimension; setting display formats, such as display colors, color fonts, of tag contents in the tag image as a preset highlighting format; in the case where the tag image and the associated image are overlapped, setting the tag image to be displayed on an upper layer, so as to avoid being shielded by the associated image. The display manner here of the associated image and the tag image in the personalized display area can be mosaicking display or random position display. For example, reference is made to FIG. 9, which is a schematic diagram of a page display picture provided by an embodiment of the present disclosure.

Figure 9:
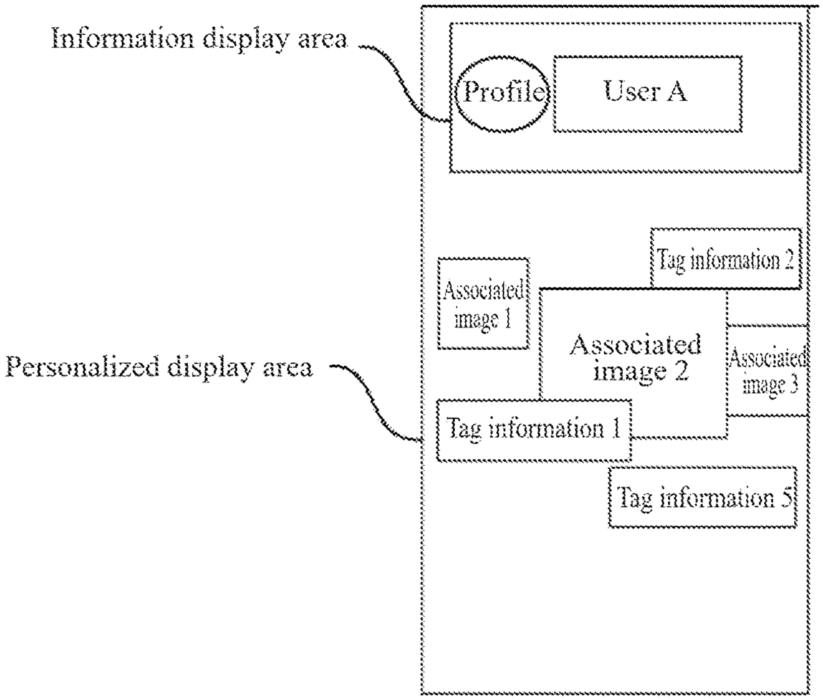
FIG. 9 is a schematic diagram of a page display picture provided by an embodiment of the present disclosure.

In FIG. 9, the tag contents in the tag image are set as a highlighting format, and the tag image is set on the upper layer of the associated image. Further, the display positions of the associated images and the tag images in FIG. 9 may be randomly changed, during the position changes, the tag images are kept to be displayed in a highlighting manner and on the upper layer, and in the case where there is an overlap with any associated image, the tag images are all displayed on the upper layer of the above associated image. During the random changes, the associated image may be adjusted in display dimension, for example, in the case of being at a central display position, the associated image is adjusted to increase in dimension, and in the case of being at other display positions than the central display position, the associated image is adjusted to decrease in dimension. The display dimension of the tag image can be kept unchanged during the random changes, so as to realize the highlighting of the tag information.

In some embodiments, the associated images in the personalized display area may be displayed in a mosaicking manner, and meanwhile, the tag images are displayed, in an overlapping manner, on the upper layer of the above associated images displayed in a mosaicking manner, where the transparency of the tag images may be set as 0, or the transparency of the tag images is smaller than a preset value, so as to achieve the highlighting of the tag information. Optionally, the tag images may be randomly changed in position on the upper layer of the associated images displayed in a mosaicking manner.

Figure 10:
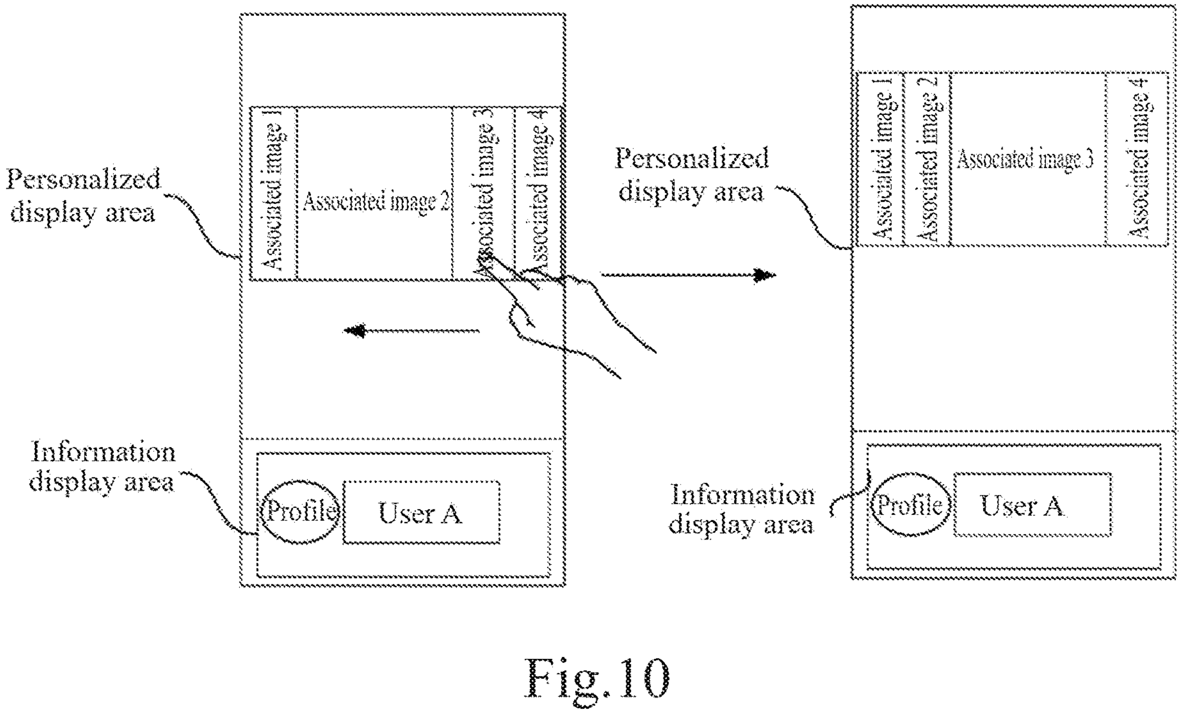
FIG. 10 is a schematic diagram of a switching process of associated images in a page display picture provided by an embodiment of the present disclosure.

On the basis of the above embodiment, an embodiment of the present disclosure provides a further display manner for media data information in a personalized display area. Specifically, the personalized display area displays a plurality of associated images, which include a complete display image and an overlapped display image, the complete display image and the overlapped display image being switchable through a preset swipe operation. As an example, reference is made to FIG. 10, which is a schematic diagram of a switching process of associated images in a page display picture provided by an embodiment of the present disclosure. In the left diagram of FIG. 10, the associated image 2 is a complete display image; the associated image 1, the associated image 3 and the associated image 4 are overlapped display images; and in the right diagram, the associated image 3 is a complete display image, and the associated image 1, the associated image 2 and the associated image 4 are overlapped display images, wherein the overlapped display images are at least partially shielded, and there may be cases where the partially shielded images are completely shielded.

In response to the swipe operation in the personalized display area, the complete display images and the overlapped display images are switched, for example, a leftward swipe operation is performed on the basis of the left diagram, so as to switch the associated image 3 to be the complete display image and to switch the associated image 2 to the overlapped display image. Here, the swipe operation in the personalized display area may further include a rightward swipe operation. In other embodiments, the swipe operation in the personalized display area may further include an up-and-down swipe operation, and accordingly, the complete display images and the overlapped display images may be arranged one over another, to which no definition is made herein.

The above display manner of the media data information in the personalized display area increases the interaction process with the user and improves the interactivity of the page display picture.

In any page display picture, the display positions of the media data information in the page display picture may be adjusted. For example, an adjustment mode of the page display picture may be entered depending on the interactive trigger operation, in which adjustment mode the position of any media data information may be adjusted. For example, the adjustment mode of the page display picture may be entered by triggering through a click operation on a mode trigger control, or a click operation, which exceeds a preset time, on a specific position in the page display picture, or a swipe operation on a preset track, or the like.

In the above adjustment mode, in response to a position adjustment operation on any one piece of media data information, the display position of the media data information in the personalized display area is updated, the media data information including one or more of the associated images, the tag information, and the preset placeholder images.

The position adjustment operation on any one piece of media data information is detected, the adjustment positions of the media data information and the adjustment positions of the adaptively adjusted other media data information are determined, and the respective media data information is displayed according to the adjustment positions, wherein the position adjustment operation may be a double-click operation, the media data information to be adjusted being is determined based on the first click operation and the adjusting positions of the media data information to be adjusted is determined by the next click operation. The position adjustment operation may, depending on a click-and-drag operation on the media data information, determine a release position of the drag operation as an adjustment position of the media data information.

Optionally, the adjustment position of the media data information to be adjusted may be a position between two pieces of media data information, correspondingly, the media data information to be adjusted is added between the two pieces of media data information, and accordingly, the display position of at least one of the two pieces of media data information and the display position of other pieces of media data information are adjusted. Optionally, the position adjustment operation of the media data information may be interchange of the display positions of two pieces of media data information, for example, the adjustment position of the media data information to be adjusted may be a display position of any other piece of media data information, and correspondingly, any other piece of media data information is adjusted to the original display position of the above media data information to be adjusted, so that interchange of the display positions of the two pieces of media data information is realized.

Optionally, in the case where the tag information and the associated image are respectively displayed through two display layers, the display layer to be adjusted may be determined, and the display position of the tag information is adjusted in an adjustment mode of the second display layer; the display position of the associated image is adjusted in an adjustment mode of the first display layer.

After the adjustment of the page display picture is finished, the adjusted page display picture is displayed. In this embodiment, the personalized adjustment of the page display picture by the user is realized by the adjustment operation of the page display picture in response to the user, thereby meeting the personalization demands and the interaction demands of the user.

On the basis of the above embodiment, the associated media data corresponding to the page user can be played simultaneously based on the display of the page display picture, and the user does not need to perform a multi-step selection operation in the page display picture, which simplifies the playing process of the media data.

In some embodiments, the page display picture may be synchronously displayed in response to a page trigger operation, and target media data corresponding to the page display picture is played, the target media data being one or more pieces of the associated media data of a page user.

In some embodiments, the playing of the target media data corresponding to the page display picture comprises: responding to a play trigger operation, and playing the target media data corresponding to the page display picture. Here, after the page display picture is displayed, a play trigger operation of the user in the page display picture is detected, the target media data is played in response to the play trigger operation, and the media data can be prevented from being played due to misoperation of the page display picture by setting the play trigger operation.

The play trigger operation can be a swipe trigger operation of a preset track in the page display picture, such as a top-down swipe operation in the page display picture. For example, reference is made to FIG. 11, which is a schematic diagram of playing of a target media data provided by an embodiment of the present disclosure. The swipe trigger operation may be preset and may also be a swipe operation of other tracks, to which no limitation is made herein. The play trigger operation may be a trigger operation on a play control displayed in the page display picture. The page display picture can also include a play control which can be arranged in the personalized display area. Optionally, the play control may be displayed through different display layers, and the trigger operation on the play control may be a click operation on the play control. The play trigger operation may be a trigger operation on any associated image in the page display picture or a trigger operation on any tag information in the page display picture.

In response to any of the above play trigger operations, a target media data is determined, and the target media data is displayed. The above play trigger operations are simple and convenient, which can realize one-click play of the media data, thereby replacing the multi-step selection of the media data and simplifying the playing process of the media data.

The determined target media data in response to a swipe trigger operation of a preset track in a page display picture may be randomly determined media data in the associated media data of the page user, or the target media data may also be media data determined according to the degree of concern of the associated media data in the associated media data of the page user; alternatively, the target media data can also be media data determined according to the playing sequence of the associated media data in the associated media data of the page user; alternatively, the target media data may also be media data corresponding to the media data information displayed in the page display picture. The target media data here may include a plurality of media data, for example, it is possible to randomly sequence the associated media data of the page user to form a random playlist and to sequentially determine the target media data to be played according to the random playlist. For example, it is further possible to sequence the associated media data according to the degree of concern, to determine a sequential playlist, and to determine the target media data to be played sequentially according to the sequential playlist. For example, the target media data to be played is determined in turn according to the storage sequence of the associated media data, wherein the storage sequence may be determined by setting a timestamp of an identifier such as "favorite" or "like" for the associated media data. For example, a playlist is formed according to the associated media data corresponding to the associated images displayed in the page display picture, wherein the playlist may be a random playlist or a sequential playlist, and the target media data to be played is sequentially determined based on the playlist. For example, a playlist is formed according to the associated media data corresponding to tag information displayed in a page display picture, and the target media data to be played is sequentially determined based on the playlist.

In response to the trigger operation on the associated images the target media data may be the media data corresponding to the triggered associated images and the target media data here may be of one piece. Accordingly, the play strategy for the target media data may be loop play. In response to the trigger operation on the tag information, the target media data may be media data corresponding to the triggered tag information. The target media data here may be of one or more pieces, it is possible to form a playlist by a plurality of associated media data corresponding to the triggered tag information, wherein the playlist may be a random playlist or a sequential playlist, and the target media data to be played is sequentially determined based on the playlist. For example, reference is made to FIG. 11, in which the play trigger operation is a downward swipe operation in the page display picture, and the determined target media data is the associated media data corresponding to the associated image 2.

On the basis of the above embodiments, the media data information corresponding to the target media data in the personalized display area is determined, and a play identifier is provided on the display position of the media data information. The target media data is prompted by providing the play identifier for the media data information corresponding to the target media data being played, wherein the play identifier may be a sound wave bar. For example, reference is made to the sound wave bar provided at the display position of the associated image 2 in FIG. 11.

Figure 11:
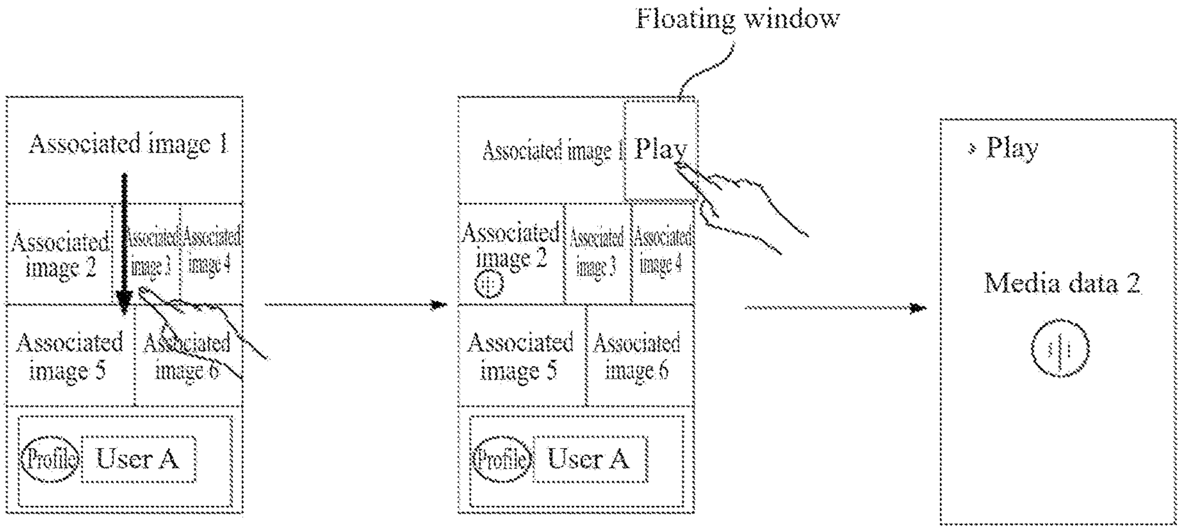
FIG. 11 is a schematic diagram of playing of a target media data provided by an embodiment of the present disclosure.

On the basis of the above embodiment, a play floating window of the target media data is displayed in the page display picture; and in response to the trigger operation on the play floating window, the page display picture is switched into a play display picture of the target media data. Referring to FIG. 11, a play floating window of target media data is provided in the upper right corner of FIG. 11. It may be understood that no definition is made to the position where the play floating window is provided. Further, the display position of the play floating window is adjusted in response to the drag operation on the play floating window. Further, the display dimension of the play floating window is adjusted in response to the dimension adjustment operation on the play floating window, wherein the dimension adjustment operation may be a drag operation on any side or corner of the play floating window.

The play floating window is provided to simultaneously display the homepage display picture and the reduced play display picture and to realize the switching between the homepage display picture and the play display picture.

According to the technical solution of the embodiment of the present disclosure, by means of displaying the page display picture, a personalized display is performed in the page display picture based on the associated media data of the page user. Meanwhile, on the basis of displaying the page display picture, the target media data in the associated media data of the page user is played, which does not require a multi-step selection operation on the target media data is not needed, thereby simplifying the playing process of the media data.

On the basis of the above embodiments, page display pictures corresponding to different users can be entered according to different page trigger operations. For example, a page trigger operation may include one or more of the following: trigger operation on a page tag and switching operation on the page tag; correspondingly, the page display picture is a master-state page display picture of the current login user; wherein the current login user is the current login user of an application program in an electronic device. The master-state page display picture comprises a personalized display area, in which the media data information is determined based on the associated media data of the current login user, and an information display area which displays the relevant information of the current login user.

For example, the page trigger operation includes an access operation of an associated user, and accordingly, the page display picture is a guest-state page display picture of the associated user. In the running process of the application program, in response to the access operation of the associated user, the guest-state page display picture of the associated user is displayed, and correspondingly, the guest-state page display picture comprises a personalized display area and an information display area, wherein the information in the information display area is the relevant information of the associated user. The media data information in the personalized display area is determined based on the associated media data of the associated user, and may include one or more of an associated image, tag information, and a preset placeholder image of the associated media data of the associated user, to which no definition is made herein. It may be understood that the display content and the display manner of the media data information in the personalized display area in the guest-state page display picture can be configured according to the display demands of the associated users.

In the process of displaying the guest-state page display picture, the associated media data of the associated user can be played. In some embodiments, the target media data corresponding to the guest-state page display picture may be played while the guest-state page display picture is displayed, where the determination manner of the target media data is not defined, and reference may be made to the determination manner of the target media data in the above embodiments. In some embodiments, in the displaying process of the guest-state page display picture, in response to a play trigger operation on the guest-state page display picture, the target media data corresponding to the guest-state page display picture is played.

By entering the guest-state page display picture, the access to the guest-state page display picture of the associated user can be realized, and the personalized display information of the associated user in the media data dimension can be known. By displaying the target media data corresponding to the guest-state page display picture, the way of knowing the media data is broaden.

On the basis of the above embodiments, in the process of displaying the guest-state page display picture or the playing process of the target media data, a preset operation on the guest-state associated media data in the guest-state page display picture is detected, and the guest-state associated media data is added as the associated media data of the current login user. The preset operation herein includes, but is not limited to, an operation of clicking "favorite", an operation of clicking "like", a download operation, etc. on the guest-state associated media data. By performing a preset operation on the media data of interest in the guest-state page display picture, the media data of interest is added into the associated media data of the current login user, so that the media data of interest are found in the guest-state page display picture without any need to conduct a search for new data in the master-state page display picture, thereby simplifying the process of finding the media data.

Figure 12:
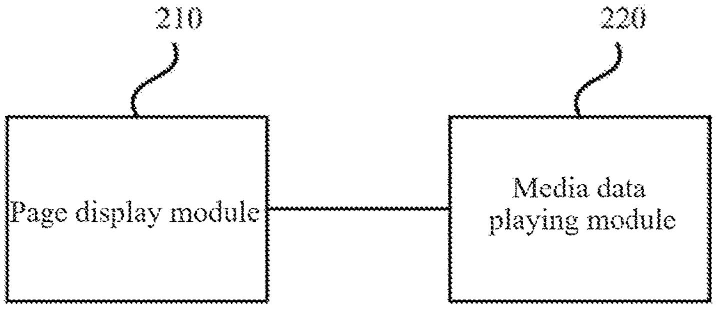
FIG. 12 is a schematic structural diagram of a media data playing device provided by an embodiment of the present disclosure.

FIG. 12 is a schematic structural diagram of a media data playing device provided by an embodiment of the present disclosure, and as shown in FIG. 12, the device comprises a page display module 210 and a media data playing module 220.

The page display module 210 is configured to display a page display picture including a personalized display area and an information display area in response to a page trigger operation, wherein the personalized display area displays media data information of associated media data of a page user;

The media data playing module 220 is configured, in response to a play trigger operation of the page display picture, to play target media data corresponding to the play trigger operation, the target media data belonging to associated media data of the page user.

In the technical solution provided by the embodiment of the present disclosure, by displaying a page display picture, a personalized display is performed in the page display picture based on the associated media data of a page user. Meanwhile, on the basis of displaying the page display picture, the target media data in the associated media data of the page user is played, which does not require a multi-step selection operation on the target media data is not needed, thereby simplifying the playing process of the media data.

Based on the above embodiments, optionally, the media data information displayed in the personalized display area includes associated images of at least partially associated media data of the page user, and/or tag information corresponding to the associated media data of the page user.

Optionally, the media data information displayed in the personalized display area includes the associated images and/or tag images corresponding to the tag information, wherein the associated images and/or the tag images are displayed in a mosaicking manner.

Optionally, the device further comprises a first image mosaicking module configured to:

determine the display positions of the associated images and/or the tag images in the personalized display area according to the display sequence of the associated images and/or the tag images, and display the associated images and/or the tag images at each display position.

Optionally, the device further comprises a second image mosaicking module configured to:

acquire a mosaicking display frame, wherein the mosaicking display frame comprises a plurality of display positions; and determine the display positions of the associated images and/or the tag images in the mosaicking display frame, and display correspondingly the associated images and/or the tag images at the display positions.

Optionally, the plurality of display positions included in the mosaicking display frame are different in dimension.

The second image mosaicking module is configured to match the dimensions of the display positions with the dimensions of the associated images and/or the tag images to obtain the matching degree of the images and the display positions, and to determine the display positions corresponding to the associated images and/or the tag images based on the matching degree; or to match the first priority of the associated images and/or the tag images with the second priority of the display positions, and determine the display positions corresponding to the associated images and/or the tag images according to a priority matching result, wherein the second priority of the display positions is determined based on the dimension and/or position of the display position.

Optionally, the tag information is highlighted within the personalized display area.

Optionally, the associated images are displayed through a first display layer, the tag information is displayed through a second display layer, and the second display layer is located on an upper layer of the first display layer.

Optionally, the tag information in the second display layer is displayed based on a preset display sequence; or the display positions of the tag information in the second display layer match the display positions of corresponding associated images in the first display layer.

Based on the above embodiments, optionally, the personalized display area displays a plurality of associated images, which include a complete display image and an overlapped display image, the complete display image and the overlapped display image being switchable through a preset swipe operation.

Based on the above embodiments, optionally, the device further comprises an associated media data determining module configured to:

sequence a plurality of associated media data according to the degree of concern of the associated media data in the plurality of associated media data of the page user, and screen the associated media data based on the sequence and the preset amount.

Optionally, the media data information displayed in the personalized display area further includes preset placeholder images;

the device further comprises a placeholder image calling module configured to call the preset placeholder images, in the case where the amount of the plurality of associated media data of the page user is smaller than a preset amount.

Based on the above embodiments, optionally, the device further comprises:

an adjustment module configured, in response to a position adjustment operation on any one piece of media data information, to update the display position of the media data information in the personalized display area, the media data information including one or more of the associated images, the tag information, and the preset placeholder images.

Based on the above embodiments, optionally, the media data playing module 220 is configured to play the target media data corresponding to the page display picture in response to a play trigger operation, wherein the play trigger operation comprises one or more of the following: a swipe trigger operation of a preset track in the page display picture; a trigger operation on a play control displayed in the page display picture; a trigger operation on any associated image in the page display picture, or a trigger operation on any tag information in the page display picture.

Optionally, the target media data comprises any one of the following: media data that is randomly determined in the associated media data of the page user; media data that is determined according to the degree of concern in the associated media data of the page user; media data that is determined according to the playing sequence in the associated media data of the page user; media data corresponding to the triggered associated images; media data corresponding to the triggered tag information.

Based on the above embodiments, optionally, the device further comprises: a play floating window display module configured to display the play floating window of the target media data in the page display picture;

a picture switching module configured to switch the page display picture into the play display picture of the target media data, in response to a trigger operation on the play floating window.

Based on the above embodiments, optionally, the device further comprises an identifier setting module configured to determine the media data information corresponding to the target media data in the personalized display area and to provide a play identifier on the display position of the above media data information.

Based on the above embodiments, optionally, the page trigger operation includes one or more of the following: a trigger operation on a page tag and a switching operation on the page tag; correspondingly, the page display picture is a master-state page display picture of the current login user;

the page trigger operation includes an access operation of an associated user, and accordingly, the page display picture is a guest-state page display picture of the associated user.

Optionally, in the process of displaying the guest-state page display picture, a preset operation on the guest-state associated media data in the guest-state page display picture is detected, and the guest-state associated media data is added as the associated media data of the current login user.

Based on the above embodiments, optionally, the device further comprises a display area adjustment module, which is configured to adjust the display position of the information display area in response to a position adjustment operation on the information display area in the page display picture, or to adjust the area size and the display content of the information display area in response to the display adjustment operation on the information display area in the page display picture.

The media data playing device provided by any embodiment of the present disclosure can implement the media data playing method provided by any embodiment of the present disclosure and possesses corresponding functional modules for implementing the method with beneficial effects.

It should be noted that, the units and modules included in the above device are divided merely depending on functional logic, but are not limited to the above division, as long as the corresponding functions can be implemented; in addition, specific names of the functional units are also used only for distinguishing one functional unit from another, and are not used for limiting the protection scope of the embodiments of the present disclosure.

Figure 13:
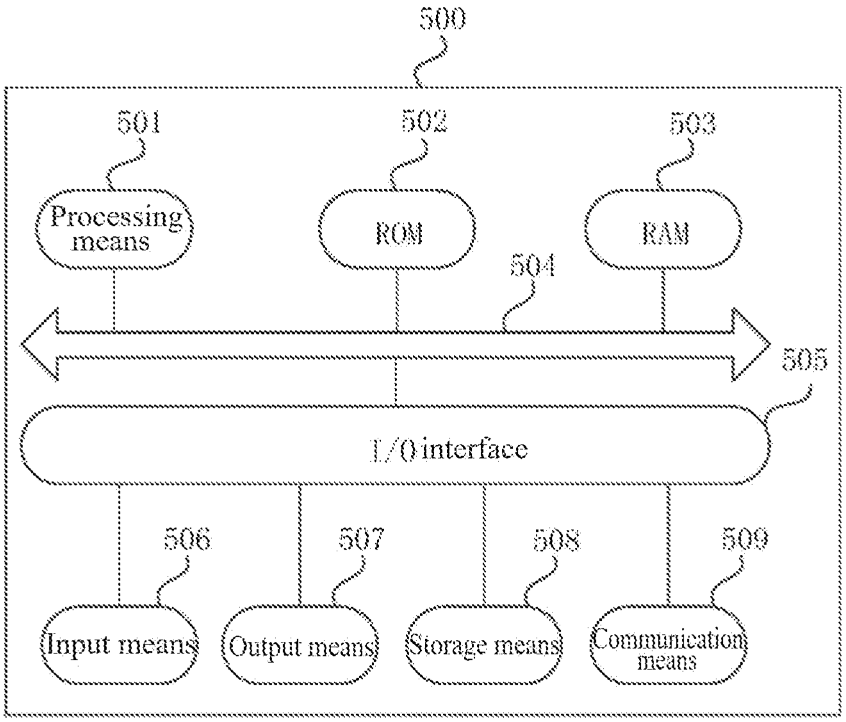
FIG. 13 is a schematic structural diagram of an electronic device provided by an embodiment of the present disclosure.

FIG. 13 is a schematic structural diagram of an electronic device provided by an embodiment of the present disclosure. Referring now to FIG. 13, it shows a schematic structural diagram of an electronic device (e.g., terminal device or server in FIG. 13) 500 suitable for implementing embodiments of the present disclosure. The terminal devices in the embodiment of the present disclosure may include, but are not limited to, mobile terminals, such as mobile phones, laptops, digital broadcast receivers, PDAs (personal digital assistants), PADs (tablet computers), PMPs (portable multimedia players), on-board terminals (e.g., on-board navigation terminals), and the like, as well as fixed terminals, such as digital TVs, desktop computers, and the like. The electronic device as shown in FIG. 13 is only an example, and should not bring any limitation to the functions and the scope of use of the embodiments of the present disclosure.

As shown in FIG. 13, the electronic device 500 may include a processing means (e.g., central processing unit, graphics processor, etc.) 501 which may perform various appropriate actions and processes in accordance with a program stored in a Read Only Memory (ROM) 502 or a program loaded from a storage means 508 into a Random Access Memory (RAM) 503. In the RAM 503, various programs and data necessary for the operation of the electronic device 500 are further stored. The processing means 501, the ROM 502, and the RAM 503 are connected to each other through a bus 504. An editing/output (I/O) interface 505 is also connected to the bus 504.

Usually, the following means may be connected to the I/O interface 505: input means 506 including, for example, a touch screen, a touch pad, a keyboard, a mouse, a camera, a microphone, an accelerometer, a gyroscope, etc.; output means 507 including, for example, a Liquid Crystal Display (LCD), a speaker, a vibrator, etc.; storage means 508 including, for example, a magnetic tape, a hard disk, etc.; and communication means 509. The communication means 509 may allow wireless or wired communication of the electronic device 500 with other devices for data exchange. Although FIG. 13 illustrates an electronic device 500 having various means, it shall be understood that it is not compulsory to implement or possess all of the illustrated means. More or fewer means may be alternatively implemented or possessed.

In particular, the processes described above with reference to the flowchart may be implemented as a computer software program, according to the embodiments of the present disclosure. For example, embodiments of the present disclosure include a computer program product comprising a computer program carried on a non-transitory computer-readable medium, the computer program containing program code for performing the method illustrated by the flowchart. In such an embodiment, the computer program may be downloaded and installed from a network via the communication means 509, or installed from the storage means 508, or installed from the ROM 502. The computer program, when executed by the processing means 501, performs the above functions defined in the method of the embodiments of the present disclosure.

The names of messages or information exchanged between a plurality of devices in the embodiments of the present disclosure are for illustrative purposes only, and are not intended to limit the scope of the messages or information.

The electronic device provided by the embodiments of the present disclosure and the media data playing method provided by the above embodiments belong to the same inventive concept, and technical details that are not described in detail in the present embodiment can be referred to the above embodiments, and the present embodiment and the above embodiments have the same beneficial effects.

The embodiments of the present disclosure provide a computer storage medium having a computer program stored thereon, the program, when executed by a processor, implementing the media data playing method provided by the above embodiments.

It should be noted that the computer-readable medium of the present disclosure may be a computer-readable signal medium or a computer-readable storage medium or any combination of the two. A computer-readable storage medium may be, for example, but is not limited to, an electronic, magnetic, optical, electromagnetic, infrared, or semiconductor system, device, or means, or any combination of the foregoing. More specific examples of the computer-readable storage medium may include, but are not limited to, an electrical connection having one or more wires, a portable computer diskette, a hard disk, a Random Access Memory (RAM), a Read-Only memory (ROM), an erasable programmable read-only memory (EPROM or flash memory), an optical fiber, a portable compact disc read-only memory (CD-ROM), an optical storage means, a magnetic storage means, or any suitable combination of the foregoing. In the present disclosure, the computer-readable storage medium may be any tangible medium that contains or stores a program for use by or in combination with an instruction execution system, device, or means. Besides, in the present disclosure, the computer-readable signal medium may include a data signal with computer-readable program code embodied therein, which is propagated in baseband or as part of a carrier wave. Such a propagated data signal may take a variety of forms, including, but not limited to, electro-magnetic signal, optical signal, or any suitable combination thereof. The computer-readable signal medium may further be any computer-readable medium that is not a computer-readable storage medium and that can communicate, propagate, or transmit a program for use by or in combination with an instruction execution system, device, or means. Program code embodied on a computer-readable medium may be transmitted with any appropriate medium, including, but not limited to, electrical wires, optical cables, RF (radio frequency), etc., or any suitable combination thereof.

In some embodiments, clients and servers may communicate by means of any currently known or future developed network Protocol, such as HTTP (HyperText Transfer Protocol), and may be interconnected with digital data communication (e.g., a communication network) in any form or medium. Examples of communication network include a Local Area Network ("LAN"), a Wide Area Network ("WAN"), an interconnection network (e.g., the Internet), and an end-to-end network (e.g., ad hoc end-to-end network), as well as any currently known or future developed network.

The computer-readable medium may be contained in the electronic device, or may stand alone and not be assembled into such electronic device.

The computer-readable medium carries one or more programs which, when executed by the electronic device, cause the electronic device The computer-readable medium carries one or more programs which, when executed by the electronic device, cause the electronic device to display a page display picture in response to a page trigger operation, the page display picture including a personalized display area and an information display area, wherein the personalized display area displays media data information of associated media data of a page user; and to play target media data corresponding to the page display picture, the target media data belonging to associated media data of the page user.

Computer program code for carrying out operations of the present disclosure may be written in any one or more programming languages or combination thereof, the programming languages including, but not limited to, object-oriented programming languages, such as Java, Smalltalk, C++, and also including conventional procedural programming languages, such as the "C" language or similar programming languages. The program code may be executed entirely on a user's computer, partly on a user's computer, as a stand-alone software package, partly on a user's computer and partly on a remote computer, or entirely on a remote computer or server. In the cases where a remote computer is involved, the remote computer may be connected to the user's computer through any type of network, including a Local Area Network (LAN) or a Wide Area Network (WAN), or may be made to an external computer (for example, through the Internet using an Internet service provider).

The flowchart and block diagrams in the accompanying drawings illustrate the architecture, functionality, and operation of possible implementations of systems, methods and computer program products according to various embodiments of the present disclosure. In this regard, each block in the flowchart or block diagrams may represent a module, program segment, or a part of code, which comprises one or more executable instructions for implementing the specified logical function(s). It should also be noted that, in some alternative implementations, the functions noted in the block may occur in an order different from what is noted in the drawings. For example, two blocks shown in succession may, in fact, be executed substantially concurrently, or the blocks may sometimes be executed in the reverse order, depending on the function involved. It is further to be noted that each block of the block diagrams and/or flowchart and combinations of blocks in the block diagrams and/or flowchart can be implemented by special hardware-based systems that perform specified functions or operations, or can be implemented by combinations of special hardware and computer instructions.

The concerned units as described in the embodiments of the present disclosure may be implemented by software or hardware. The name of a unit does not constitute a definition to the unit itself in some cases, for example, a first acquisition unit may also be described as a "unit that acquires at least two Internet protocol addresses".

The functions described herein above may be implemented, at least in part, by one or more hardware logic components. As a nonrestrictive example, exemplary types of hardware logic components that may be used include field Programmable Gate Arrays (FPGAs), Application Specific Integrated Circuits (ASICs), Application Specific Standard Products (ASSPs), system on a chip (SOCs), Complex Programmable Logic Devices (CPLDs), and the like.

In the context of the present disclosure, a machine-readable medium may be a tangible medium that can contain or store a program for use by or in combination with an instruction execution system, means, or device. The machine-readable medium may be a machine-readable signal medium or a machine-readable storage medium. The machine-readable medium may include, but is not limited to, an electronic, magnetic, optical, electromagnetic, infrared, or semiconductor system, means, or device, or any suitable combination of the foregoing. More specific examples of a machine-readable storage medium would include an electrical connection based on one or more wires, a portable computer diskette, a hard disk, a Random Access Memory (RAM), a Read-Only Memory (ROM), an erasable programmable read-only memory (EPROM or flash memory), an optical fiber, a portable compact disc read-only memory (CD-ROM), an optical storage device, a magnetic storage device, or any suitable combination of the foregoing.

[At the conclusion of this detailed description, all that is intended to be protected in form of the claims may be repeated as follows:]

According to one or more embodiments of the present disclosure, [Example One] provides a media data playing method, comprising:

displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user.

According to one or more embodiments of the present disclosure, [Example Two] provides a media data playing method according to Example One, further comprising:

the media data information displayed in the personalized display area includes associated images of at least partially associated media data of the page user, and/or tag information corresponding to the associated media data of the page user.

According to one or more embodiments of the present disclosure, [Example Three] provides a media data playing method according to Example One, further comprising:

the media data information displayed in the personalized display area includes the associated images and/or tag images corresponding to the tag information, wherein the associated images and/or the tag images are displayed in a mosaicking manner.

According to one or more embodiments of the present disclosure, [Example Four] provides a media data playing method according to Example One, further comprising:

the mosaicking display method for the associated images and/or the tag images comprises: determining the display positions of the associated images and/or the tag images in the personalized display area according to the display sequence of the associated images and/or the tag images, and displaying the associated images and/or the tag images at respective display position.

According to one or more embodiments of the present disclosure, [Example Five] provides a media data playing method according to Example One, further comprising:

the mosaicking display method for the associated images and/or the tag images comprises: acquiring a mosaicking display frame which includes a plurality of display positions; determining the display positions of the associated images and/or the tag images in the mosaicking display frame, and displaying correspondingly the associated images and/or the tag images at the display positions.

According to one or more embodiments of the present disclosure, [Example Six] provides a media data playing method according to Example One, further comprising:

the plurality of display positions included in the mosaicking display frame are different in dimension;

said determining display positions of the associated images and/or the tag images in the mosaicking display frame comprises: matching the dimensions of the display positions with the dimensions of the associated images and/or the tag images to obtain the matching degree of the images and the display positions, and determining the display positions corresponding to the associated images and/or the tag images based on the matching degree; or matching the first priority of the associated images and/or the tag images with the second priority of the display positions, and determining the display positions corresponding to the associated images and/or the tag images according to a priority matching result, wherein the second priority of the display positions is determined based on the dimension and/or position of the display position.

According to one or more embodiments of the present disclosure, [Example Seven] provides a media data playing method according to Example One, further comprising:

the tag information is highlighted within the personalized display area.

According to one or more embodiments of the present disclosure, [Example Eight] provides a media data playing method according to Example One, further comprising:

the associated images are displayed through a first display layer, the tag information is displayed through a second display layer, and the second display layer is located on an upper layer of the first display layer.

According to one or more embodiments of the present disclosure, [Example Nine] provides a media data playing method according to Example One, further comprising:

the tag information in the second display layer is displayed based on a preset display sequence; or the display positions of the tag information in the second display layer match the display positions of corresponding associated images in the first display layer.

According to one or more embodiments of the present disclosure, [Example Ten] provides a media data playing method according to Example One, further comprising:

the personalized display area displays a plurality of associated images, which include a complete display image and an overlapped display image, the complete display image and the overlapped display image being switchable through a preset swipe operation.

According to one or more embodiments of the present disclosure, [Example Eleven] provides a media data playing method according to Example One, further comprising:

the method of determining at least partially associated media data comprises: sequencing a plurality of associated media data according to the degree of concern of the associated media data in the plurality of associated media data of the page user, and screening the associated media data based on the sequence and the preset amount.

According to one or more embodiments of the present disclosure, [Example Twelve] provides a media data playing method according to Example One, further comprising:

the media data information displayed in the personalized display area further includes preset placeholder images;

the method further comprises calling the placeholder images, in the case where the amount of the plurality of associated media data of the page user is smaller than a preset amount.

According to one or more embodiments of the present disclosure, [Example Thirteen] provides a media data playing method according to Example One, further comprising:

the method further comprises updating the display position of the media data information in the personalized display area, in response to a position adjustment operation on any one piece of media data information, the media data information including one or more of the associated images, the tag information, and the preset placeholder images.

According to one or more embodiments of the present disclosure, [Example Fourteen] provides a media data playing method according to Example One, further comprising:

the playing of the target media data corresponding to the page display picture comprises: responding to a play trigger operation, and playing the target media data corresponding to the page display picture;

wherein the play trigger operation comprises one or more of the following: a swipe trigger operation of a preset track in the page display picture; a trigger operation on a play control displayed in the page display picture; a trigger operation on any associated image in the page display picture, or a trigger operation on any tag information in the page display picture.

According to one or more embodiments of the present disclosure, [Example Fifteen] provides a media data playing method according to Example One, further comprising:

the target media data comprises anyone of the following: media data that is randomly determined in the associated media data of the page user; media data that is determined according to the degree of concern in the associated media data of the page user; media data that is determined according to the playing sequence in the associated media data of the page user; media data corresponding to the media data information displayed in the page display picture; media data corresponding to the triggered associated images; media data corresponding to the triggered tag information.

According to one or more embodiments of the present disclosure, [Example Sixteen] provides a media data playing method according to Example One, further comprising:

the page trigger operation includes one or more of the following: a trigger operation on a page tag and a switching operation on the page tag; correspondingly, the page display picture is a master-state page display picture of the current login user; the page trigger operation includes an access operation of an associated user, and accordingly, the page display picture is a guest-state page display picture of the associated user.

According to one or more embodiments of the present disclosure, [Example Seventeen] provides a media data playing method according to Example One, further comprising:

in the process of displaying the guest-state page display picture, a preset operation on the guest-state associated media data in the guest-state page display picture is detected, and the guest-state associated media data is added as the associated media data of the current login user.

According to one or more embodiments of the present disclosure, [Example Eighteen] provides a media data playing method according to Example Eighteen, comprising:

a page display module configured to display a page display picture including a personalized display area and an information display area in response to a page trigger operation, wherein the personalized display area displays media data information of associated media data of a page user; and a media data playing module configured, in response to a play trigger operation of the page display picture, to play target media data corresponding to the play trigger operation, the target media data belonging to associated media data of the page user.

The above description is only illustrative of the preferred embodiments of the present disclosure and the technical principles that are employed. It shall be understood by those skilled in the art that the scope of the present disclosure herein is not limited to the technical solutions formed by particular combination of technical features described above, but shall also encompass other technical solutions formed by any combination of technical features described above or equivalents thereof without departing from the spirit of the present disclosure, such as the technical solutions formed by interchange of the above features with the technical features disclosed in the present disclosure (yet not limited thereto) having similar functions.

Furthermore, although the operations are depicted in a particular order, this should not be construed as demanding that these operations be performed in the particular order as shown or in sequential order. Under certain circumstances, multitasking and parallel processing may be advantageous. Likewise, although several specific implementation details are included in the above description, these should not be construed as limitations on the scope of the present disclosure. Certain features that are described in the context of individual embodiments can also be implemented in a combined manner in a single embodiment. Conversely, various features that are described in the context of a single embodiment can also be implemented in multiple embodiments individually or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms for implementing the claims.

What is claimed is:

1. A media data playing method, comprising:

displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user, wherein the playing of the target media data corresponding to the page display picture comprises:

playing the target media data corresponding to the page display picture in response to a page trigger operation, wherein the page trigger operation comprises one or more of the following:

a swipe trigger operation of a preset track in the page display picture;

a trigger operation on a play control displayed in the page display picture;

a trigger operation on any associated image in the page display picture, or a trigger operation on any tag information in the page display picture.

2. The method according to claim 1, wherein the media data information displayed in the personalized display area includes at least one of associated images of at least partially associated media data of the page user, or tag information corresponding to the associated media data of the page user.

3. The method according to claim 2, wherein the media data information displayed in the personalized display area includes at least one of the associated images or tag images corresponding to the tag information, wherein at least one of the associated images or the tag images are displayed in a mosaicking manner.

4. The method according to claim 3, wherein the method for displaying at least one of the associated images or the tag images in a mosaicking manner comprises:

determining the display positions of at least one of the associated images or the tag images in the personalized display area according to the display sequence of at least one of the associated images or the tag images, and displaying at least one of the associated images or the tag images at each display position.

5. The method according to claim 3, wherein the method for displaying at least one of the associated images or the tag images in a mosaicking manner comprises:

acquiring a mosaicking display frame, wherein the mosaicking display frame comprises a plurality of display positions; and determining the display positions of at least one of the associated images or the tag images in the mosaicking display frame and displaying correspondingly at least one of the associated images or the tag images at the display positions.

6. The method according to claim 5, wherein the plurality of display positions included in the mosaicking display frame are different in dimension;

said determining the display positions of at least one of the associated images or the tag images in the mosaicking display frame comprises:

matching the dimensions of the display positions with the dimensions of at least one of the associated images or the tag images to obtain the matching degree of the images and the display positions, and determining the display positions corresponding to at least one of the associated images or the tag images based on the matching degree; or matching the first priority of at least one of the associated images or the tag images with the second priority of the display positions, and determining the display positions corresponding to at least one of the associated images or the tag images according to a priority matching result, wherein the second priority of the display positions is determined based on at least one of the dimension or position of the display position.

7. The method according to claim 2, wherein the tag information is highlighted within the personalized display area.

8. The method according to claim 7, wherein the associated images are displayed through a first display layer, the tag information is displayed through a second display layer, and the second display layer is located on an upper layer of the first display layer.

9. The method according to claim 8, wherein the tag information in the second display layer is displayed based on a preset display sequence; or the display positions of the tag information in the second display layer match the display positions of corresponding associated images in the first display layer.

10. The method according to claim 2, wherein the personalized display area displays a plurality of associated images, which include a complete display image and an overlapped display image, the complete display image and the overlapped display image being switchable through a preset swipe operation.

11. The method according to claim 2, wherein the method of determining at least partially associated media data comprises:

sequencing a plurality of associated media data according to the degree of concern of the associated media data in the plurality of associated media data of the page user, and screening the associated media data based on the sequence and the preset amount.

12. The method according to claim 10, wherein the media data information displayed in the personalized display area further includes preset placeholder images;

the method further comprises:

calling the placeholder images, in the case where the amount of the plurality of associated media data of the page user is smaller than a preset amount.

13. The method according to claim 2, wherein the method further comprises:

updating the display position of the media data information in the personalized display area, in response to a position adjustment operation on any one piece of media data information, the media data information including one or more of the associated images, the tag information, and the preset placeholder images.

14. The method according to claim 1, wherein the target media data comprises any one of the following:

media data that is randomly determined in the associated media data of the page user;

media data that is determined according to the degree of concern of the associated media data in the associated media data of the page user;

media data that is determined according to the playing sequence of the associated media data in the associated media data of the page user;

media data corresponding to the media data information displayed in the page display picture;

media data corresponding to the triggered associated images;

media data corresponding to the triggered tag information.

15. The method according to claim 1, wherein the page trigger operation includes one or more of the following: a trigger operation on a page tag, and a switching operation on the page tag; correspondingly, the page display picture is a master-state page display picture of the current login user;

the page trigger operation includes an access operation of an associated user, and accordingly, the page display picture is a guest-state page display picture of the associated user.

16. The method according to claim 15, wherein in the process of displaying the guest-state page display picture, a preset operation on the guest-state associated media data in the guest-state page display picture is detected, and the guest-state associated media data is added as the associated media data of the current login user.

17. An electronic device, characterized in comprising:

one or more processors;

a storage means to store one or more programs, wherein, when executed by the one or more processors, the one or more programs enable(s) the one or more processors to implement a media data playing method, comprising:

displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user, wherein the playing of the target media data corresponding to the page display picture comprises:

playing the target media data corresponding to the page display picture in response to a page trigger operation, wherein the page trigger operation comprises one or more of the following:

a swipe trigger operation of a preset track in the page display picture;

a trigger operation on a play control displayed in the page display picture;

a trigger operation on any associated image in the page display picture, or a trigger operation on any tag information in the page display picture.

18. The electronic device according to claim 17, wherein the media data information displayed in the personalized display area includes at least one of associated images of at least partially associated media data of the page user, or tag information corresponding to the associated media data of the page user.

19. A non-transitory storage medium containing computer-executable instructions which, when executed by a computer processor, are configured to implement a media data playing A media data playing method, comprising:

displaying a page display picture in response to a page trigger operation, the page display picture including a personalized display area and an information display area, wherein the personalized display area displays media data information of associated media data of a page user; and playing target media data corresponding to the page display picture, the target media data belonging to associated media data of the page user, wherein the playing of the target media data corresponding to the page display picture comprises:

playing the target media data corresponding to the page display picture in response to a page trigger operation, wherein the page trigger operation comprises one or more of the following:

a swipe trigger operation of a preset track in the page display picture;

a trigger operation on a play control displayed in the page display picture;

a trigger operation on any associated image in the page display picture, or a trigger operation on any tag information in the page display picture.

* * * * *